United States Patent [19]

Rohr et al.

[11] Patent Number: 5,338,347

[45] Date of Patent: Aug. 16, 1994

[54] CORROSION INHIBITION COMPOSITION

[75] Inventors: Eric L. Rohr; Leonard S. Cech, both of Wickliffe; Barry M. Saltzman, Solon, all of Ohio

[73] Assignee: The Lubrizol Corporation, Wickliffe, Ohio

[21] Appl. No.: 943,941

[22] Filed: Sep. 11, 1992

[51] Int. Cl.$^5$ ................................ C09D 5/08
[52] U.S. Cl. ................ 106/14.44; 106/14.05; 106/14.13; 106/14.14; 106/14.26; 106/14.28; 106/14.29; 106/14.36; 106/14.41; 106/14.43; 427/384; 427/388.2; 427/388.4; 427/388.5; 252/388; 252/389.1; 252/389.3; 252/389.4; 252/389.5; 252/389.52; 252/389.53; 252/389.54; 252/389.61; 252/395; 428/457; 428/458; 428/461; 428/462; 428/463; 428/464; 428/469

[58] Field of Search ............... 106/14.13, 14.14, 14.05, 106/14.36, 14.41, 14.43, 14.44, 14.26, 14.28, 14.29; 427/384, 388.2, 388.4, 388.5; 428/457, 458, 461, 462, 463, 464, 469; 252/388, 389.1, 389.3, 389.4, 389.5, 389.52, 389.53, 389.54, 389.61

[56] References Cited

U.S. PATENT DOCUMENTS

| | | | |
|---|---|---|---|
| 2,695,910 | 11/1954 | Asseff et al. | 554/157 |
| 2,727,012 | 12/1955 | Treat et al. | 524/96 |
| 3,565,843 | 2/1971 | Kassinger et al. | 524/166 |
| 3,846,071 | 11/1974 | Redmore | 106/14.26 |
| 3,919,152 | 11/1975 | Krupp et al. | 524/405 |
| 4,153,465 | 5/1979 | Hund et al. | 106/14.25 |
| 4,157,991 | 6/1979 | Pilla | 106/14.26 |
| 4,238,348 | 12/1980 | Larsen et al. | 106/14.43 |
| 4,246,030 | 1/1981 | Lipinski | 106/14.14 |
| 4,264,363 | 4/1981 | Cech | 106/14.36 |
| 4,346,184 | 8/1982 | Drake | 523/451 |
| 4,475,949 | 10/1984 | Ross et al. | 106/14.28 |
| 4,495,225 | 1/1985 | Ciuba et al. | 427/236 |
| 4,629,753 | 12/1986 | Quinn | 524/394 |
| 4,728,578 | 3/1988 | Higgins et al. | 427/388.2 |
| 4,921,897 | 5/1990 | Danforth et al. | 514/405 |
| 4,946,503 | 8/1990 | Hattori et al. | 106/14.36 |
| 4,999,134 | 3/1991 | Lieber et al. | 106/14.42 |

FOREIGN PATENT DOCUMENTS

| | | | |
|---|---|---|---|
| 0414967 | 3/1991 | European Pat. Off. | |
| 3806350 | 10/1988 | German Democratic Rep. | |
| 53-069230 | 6/1978 | Japan | 106/14.13 |
| 2094776 | 9/1982 | United Kingdom | |
| 2131444 | 6/1984 | United Kingdom | 106/14.13 |

OTHER PUBLICATIONS

"Nacorr Rust & Corrosion Inhibitors", King Industries (Nov. 1991).

"Nacure & K-Cure Acid Catalysts", King Industries (1990).

Primary Examiner—Anthony Green
Attorney, Agent, or Firm—David M. Shold; Frederick D. Hunter

[57] ABSTRACT

Corrosion inhibitor compositions with improved activity are prepared from a neutral or overbased salt of an organic acid and another metal-containing corrosion inhibitor.

40 Claims, No Drawings

CORROSION INHIBITION COMPOSITION

BACKGROUND OF THE INVENTION

The present invention relates to paints and pigments with improved corrosion inhibition properties.

Mankind has long sought to protect metals, in particular ferrous metals, from corrosion. A variety of more or less effective ways to provide such protection have been discovered, many of which involve coating the metal structure with a composition which includes a metal or metal compound. Often these metals are toxic or otherwise environmentally harmful. In order to provide a more "environmentally friendly" product, certain compositions have been used which avoid or minimize the use of toxic metals or their compounds. Unfortunately many of these environmentally friendly coatings are less effective at preventing corrosion than are the traditional anti-corrosion materials.

U.S. Pat. No. 4,629,753, Quinn, Dec. 16, 1986, discloses non-asphaltic, non-mastic type, water dispersed rust inhibiting coating compositions comprising in admixture a film-forming organic polymer and a non-Newtonian colloidal disperse system which contains solid metal containing colloidal particles.

U.S. Pat. No. 4,153,465, Hund et al., May 8, 1979, discloses an anticorrosion pigment suited for paints and lacquers consisting of $CaZn_2(PO_4)_2.2H_2O$ crystallizing in the Scholzite lattice. The material is prepared by precipitating an aqueous solution containing $Ca^{2+}$ and $Zn^{2+}$ cations. It may be used in usual binders for lacquers.

U.S. Pat. No. 4,346,184, Drake, Aug. 24, 1982, discloses a water soluble zinc oxide/phosphorous pentoxide/alumina glass which, when in contact with water, releases ions which inhibit corrosion of adjacent glass surfaces. The glass may be dispersed in a resin carrier to form a paint.

U.S. Pat. No. 3,565,843, Kassinger et al., Feb. 23, 1971, discloses an organic rust inhibiting composition of (1) a gelled overbased alkaline earth metal sulfonate (such as calcium petroleum sulfonate treated with an aqueous ammonia solution) (2) a coating material, and (3) a hydrocarbon solvent. The composition is improved over conventional asphalt based "undercoatings."

U.S. Pat. No. 2,695,910, Aeseff et al., Nov. 30, 1954, discloses methods of preparation of superbased salts, i.e., metal complexes which contain substantially more metal in combination than is found in complexes prepared by the prior art. The superbased salts can be employed in lubricants and i.a. as rust inhibition compositions.

It has now been found that certain combinations of salts of organic acids with other metal-containing corrosion inhibitors lead to improved corrosion protection, so that even the environmentally friendly compositions can provide excellent corrosion protection.

SUMMARY OF THE INVENTION

The present invention provides a corrosion inhibitor composition comprising (a) at least one neutral or overbased salt of an organic acid, and (b) at least one metal-containing corrosion inhibitor other than a neutral or overbased salt of an organic acid, wherein the amount of the salt of (a) is sufficient to provide improved corrosion inhibition properties compared with those of component (b) alone.

The invention further provides a process for inhibiting corrosion of a metal, comprising applying to a surface of the metal a coating comprising (a) at least one neutral or overbased salt of an organic acid, and (b) at least one metal-containing corrosion inhibitor other than a neutral or overbased salt of an organic acid, wherein the amount of the salt of (a) is sufficient to provide improved corrosion inhibition properties compared with those of component (b) alone. The invention also provides a product prepared by such a process.

DETAILED DESCRIPTION OF THE INVENTION

The improved corrosion inhibitor composition of the present invention comprises two fundamental components. The first of these components is at least one neutral or overbased salt of an organic acid. Overbased salts are known in the art, having been described in 1954 in U.S. Pat. No. 2,695,910. They are essentially complexes of certain organic acids having metal contents which are greater than the stoichiometric amount required to neutralize the acid. Such materials are referred to in the art as overbased, superbased, hyperbased, and so on.

The terminology "metal ratio" is used in the prier art and herein to designate the ratio of the total chemical equivalents of the metal in the overbased material (e.g. a metal sulfonate, carboxylate, phosphate, or phenate) to the chemical equivalents of the metal in the product which would be expected to result from the reaction between the organic material to be overbased (e.g. sulfonic, carboxylic, or phosphorus acid or a phenol) and the metal containing reactant (a hydroxide, oxide, etc.) according to known chemical reactivity and stoichiometry of the two reactants. Thus in normal or neutral calcium sulfonate the metal ratio is one and in an overbased calcium sulfonate the metal ratio is greater than one, e.g. 4.5. Obviously, if there is present in the material to be overbased more than one compound capable of reacting with the metal, the metal ratio of the product will depend on whether the number of equivalents cf metal in the overbased product is compared to the number of equivalents expected to be present for a given single component or a combination of all such components.

The neutral salts which are useful as component (a) in this invention may be salts of various organic acidic compound such as phosphorus acids, thiophosphorus acids, sulfur acids, carboxylic acids, thiocarboxylic acids, phenols, and the like. Preferred neutral salts are those having a hydrocarbon chain of about 10 to about 70, and preferably up to about 30 carbon atoms. For some applications, however, e.g. when improved oil solubility or dispersability of the overbased salt is needed, it may be desired to provide an acid with a longer hydrocarbon group. Thus sometimes acids having in excess of 28 carbon atoms or a molecular weight (of the alkyl or aryl portion) of greater than about 379 can be preferred.

The cation can be any neutralizing ions, and is generally a metal ion, preferably a calcium, magnesium, zinc, barium, strontium, or lead ion, or a mixture of these. The most preferred salts are calcium salts, in part because they have low or no toxicity. Preparation of such salts is well known.

The overbased materials useful as component (a) generally are prepared by treating reaction mixture comprising the organic acid material to be overbased, a reaction medium consisting essentially of at least one inert organic solvent for the organic material, a stoichiometric excess of a metal base, a promoter, and an acid material. The methods for preparing the overbased materials as well as a diverse group of overbased materials are well known in the art and are disclosed for example in U.S. Pat. No. 4,728,578. Briefly, an organic acid or salt thereof is selected which is generally soluble in the reaction medium to be employed, normally a mineral oil. The organic acid is as described above, and may include aliphatic, cycloaliphatic, or aromatic groups, including groups with heteroatom substitutions, such as alkoxyalkyl groups, so long as the essentially hydrocarbon character of the compound is not destroyed.

In many instances it is preferable to use an overbased material for component (a), rather than merely the neutral salt. The added neutralization present can provide additional protection for the coated metal against corrosion which might result from the presence of any environmental acids. Furthermore, coatings prepared using overbased materials tend to provide better passive protection for the coated metal. This is in part because the coating formed, containing e.g. excess $CaCO_3$, is more impervious than corresponding films prepared using ordinary neutral salts. In addition, the excess $CaCO_3$ provides an alkaline reserve which helps keep the environment of the metal surface basic.

Illustrative sulfonic acids for component (a) include mahogany sulfonic acids, petrolatum sulfonic acids, mono- and polywax-substituted naphthalene sulfonic acids, cetylchlorobenzene sulfonic acids, cetylphenol sulfonic acids, dilauryl beta-naphthol sulfonic acids, dicapryl nitronaphthalene sulfonic acids, saturated paraffin wax sulfonic acids, unsaturated paraffin wax sulfonic acids, hydroxy-substituted paraffin wax sulfonic acids, tetraisobutylene sulfonic acids, tetraamylene sulfonic acids, chloro-substituted paraffin wax sulfonic acids, nitroso-substituted paraffin wax sulfonic acids, petroleum naphthalene sulfonic acids, cetylcyclopentyl sulfonic acids, laurylcyclohexyl sulfonic acids, mono- and polywax-substituted cyclohexyl sulfonic acids, dodecylbenzene sulfonic acids, and the like. Suitable carboxylic acids for component (a) include naphtheneic acids, alkyl-or alkenyl-substituted cyclopentanoic acids, alkyl-or alkenyl-substituted cyclohexanoic acids, and alkyl- or alkenyl-substituted aromatic carboxylic acids, including 2-ethylhexanoic acid, linolenic acid, propylene tetramer-substituted maleic acid, behenic acid, isostearic acid, pelargonic acid, captic acid, palmitoleic acid, linoleic acid, lauric acid, oleic acid, ricinoleic acid, undecyclic acids, dioctylcyclopentanecarboxylic acid, myristic acid, dilauryldecahydronaphthalene carboxylic acid, stearyloctahydroindenecarboxylic acid, palmitic acid, alkyl and alkenyl succinic acids, acids formed by oxidation of petrolatum or of hydrocarbon waxes, and commercially available mixtures of two or more carboxylic acids, such as tall oil acids, rosin acid, and the like.

The phosphorus acids generally include organophosphoric, phosphonic, or phosphinic acids, or a thio analog of any of these.

The phenols useful in component (a) include compounds with at least one hydroxy group bound directly to an aromatic ring, including alkyl phenols. Suitable materials include phenol, catechol, resorcinol, hydroquinone, cresols, ethyl phenols, alkenyl phenols, heptyl phenol, octyl phenol, dodecyl phenol, tetrapropene alkylated phenol, octadecyl phenol, tetrapropene alkylated phenol, octadecyl phenol, and polybutenyl phenols.

The metal compounds used in preparing the overbased materials of component (a) are normally the basic salts of metals of group IA and group IIA of the Periodic Table, although other metals can be used. The anionic portion of the salt can be hydroxyl, oxide, carbonate, hydrogen carbonate, nitrate, sulfite, hydrogen sulfite, thiosulfate, halide, amide, sulfate, etc. (It is recognized that oxides and hydroxides are sometimes not considered salts, but they are so considered for the present purposes.) Preferred overbased materials are prepared from the oxides, hydroxides, or alkoxides of calcium, magnesium, zinc, barium, strontium, lead, or mixtures of these. The most preferred overbased salts contain calcium as the metal.

Promoters which permit the incorporation of the excess metal into the overbased material are also well known. They include alcoholic and phenolic promoters such as methanol, ethanol, amyl alcohol, octanol, isopropanol, hydroxy substituted benzenes or naphthalenes, heptylphenols, octylphenols, nonylphenols, and mixtures of the above.

Another component of the overbased material is an acidic material (distinct from the organic acid which is referred to as the overbased acid). Included within the known group of useful acidic materials are liquid acids such as formic acid, acetic acid, nitric acid, sulfuric acid, sulfurous acid, boric acid, phosphoric acid, phosphorous acid, hydrochloric acid, hydrobromic acid, carbamic acid, substituted carbamic acids, etc. The preferred acidic material is carbon dioxide.

In preparing overbased materials, the organic acid to be overbased is brought together in an inert non-polar organic liquid carrier or solvent, with the metal base, the promoter, and the acidic material, and a chemical reaction ensues. The reaction temperature is usually about 27°–159° C. (80°–300° F.), more often about 38°–93° C. (100°–200° F.). The exact nature of the resulting overbased product is not known, but it can be described as a single phase homogeneous mixture of the solvent and either (1) a metal complex formed from the metal base, the acidic material, and the organic acid and/or (2) an amorphous metal salt formed from the reaction of the acid material with the metal base and the organic acid.

The metal ratio of component (a) is about 1 to about 61. (This corresponds to 0 to about 60 equivalents of metal salt, e.g. calcium carbonate, per mole of salt of the organic acid.) At a ratio of one, component (a) is simply the neutralized or salt form of the acid. At high metal ratios the overbased component generally may be present as a gel, that is, a non-Newtonian colloidal disperse system. The preparation of such gels is described in more detail in U.S. Pat. No. 3,492,231; U.S. Pat. No. 4,629,753 also provides a detailed description of formation of overbased materials. Preferably the metal ratio is 1 to about 31 and more preferably about 1.2 to about 21, i.e. 0 to about 30 and more preferably about 0.2 to about 20 equivalents of metal salt per mole of salt of the organic acid.

The neutral or overbased salt can be prepared and used as a mixture in a liquid carrier, which can be the organic solvent of the reaction medium for the overbasing reaction. One particularly suitable liquid carrier is propylene glycol monopropyl ether. Alternatively the neutral or overbased salt can be prepared and used as a mixture on a solid carrier. Suitable solid carriers can include a pigment or filler such as clay, talc, wallastonite, barytes, calcium carbonate, silica, mica, carbon black, and lamp black and can preferably be titanium dioxide, magnesium silicate, or zinc phosphate. The salts can be imparted to the solid carrier by dispersing the salt and the carrier with stirring in a suitable solvent such as toluene. For example, 14 g toluene can be used to disperse 20 g of talc and 16.7 g of a calcium overbased salt of a sulfonic acid (described below in Example 1). The mixture can be spread onto a glass plate and heated to dry, and the resulting solid ground to a fine powder.

The neutral or overbased salt of an organic acid is combined with another metal-containing corrosion inhibitor, to provide the present improved composition. This other inhibitor can be any of the known corrosion inhibitors, including compounds of zinc, calcium, magnesium, barium, lead, and strontium, present for example as chromates, phosphates, phosphosilicates, oxides, borates, metaborates, borosilicates, phosphites, hydroxyphosphites, silicates, and molybdates. Preferably, however, the other corrosion inhibitor is an "environmentally friendly" pigment, such as barium metaborate, calcium silicate, calcium borosilicate, calcium phosphosilicate, calcium molybdate, calcium strontium phosphosilicate, zinc oxide, zinc molybdate, zinc phosphate, and zinc hydroxyphosphite. Preferably the pigment zinc phosphate, barium metaborate, or mixed strontium and calcium phosphosilicates.

The relative amounts of components (a) and (b) should be such as to provide improved corrosion resistance compared with a single component in the absence of the other. It has been found that in many cases the combination of components (a) and (b) actually leads to synergism in which the combination provides greater corrosion protection than would be expected based on the properties observed from either component alone. Thus it is preferred that the relative amounts of (a) and (b) be such as to exhibit this synergism. Often relative ratios of about 1:20 to about 20:1 will be suitable, and preferably ratios a:b of about 1:1 to about 1:10 are desired (all ratios being on the basis of dry solids weight).

Although the corrosion inhibitor composition can be used without further additives, one embodiment of the invention provides for the presence of a dispersing medium or vehicle suitable for dissolving or dispersing components (a) and (b) and for applying them to a surface to impart corrosion resistance thereto, thus making an anticorrosion paint. The vehicle is normally a volatile liquid such as an organic solvent or water, generally those which are substantially chemically inert to components (a) and (b) which will be dissolved or suspended therein. Suitable organic solvents include alkanes and haloalkanes of five to eighteen carbon atoms, polyhalo and perhaloalkanes of up to about six carbon atoms, cycloalkanes of five or more carbon atoms, corresponding alkyl- or halo-substituted cycloalkanes, aryl hydrocarbons, alkylaryl hydrocarbons, haloaryl hydrocarbons, ethers such as dialkyl ethers, alkyl aryl ethers, cycloalkyl ethers, cycloalkylalkyl ethers, alkanols, alkylene glycols, polyalkylene glycols and esters of said glycols, alkyl ethers of alkylene glycols and polyalkylene glycols, alkanal amines, amines and liquid polyamines, dibasic alkanoic acid diesters, silicate esters, glycerides, epoxidized glycerides, aliphatic aromatic esters, petroleum waxes, slack waxes (non-refined paraffinic based petroleum fractions) synthetic hydrocarbon waxes, chlorinated waxes, and low molecular weight liquid polymers (oligomers). Specific examples of organic vehicles are set forth in U.S. Pat. No. 4,629,753.

For reasons of cost and environmental concerns, water is often a preferred vehicle, and compositions which contain at least some water as a component of the vehicle are therefore preferred. The technology for preparation of so-called water-based paints is well-known to those skilled in the art.

The composition further preferably comprises a film-forming amount of a film-forming organic polymer admixed therewith, optionally in powdered form. Such a material can serve as a binder to bind the solid components of the present invention to the surface to be protected, and also to provide itself some measure of physical or chemical protection to the surface. Such polymers may be thermoplastic or thermosetting. Representative classes of suitable film-forming organic polymers suitable for use in the coating compositions of the present invention include polyolefins, polyamides, acrylics, polystyrenes, polyethers, polyfluorocarbons, polymer-captans, polyesters, polymethanes, acetal resins, polyterpenes, phenolics, cellulosics, melamine resins, furane resins, alkyd resins, silicone resins, natural resins, and mixtures of the above. These classes of resins are well known for use in coating compositions.

The film forming organic polymer suitable for use in the present invention can be either water soluble or water insoluble. When the organic polymers are water insoluble, they will generally be present in the water phase (if water is used as the vehicle) in the form of disperse particles ranging in size from about 0.1 to about 10.0 microns. In general the amount of the film forming organic polymer useful in the coating compositions of this invention is an amount sufficient to coalesce to a solid film after application of the coating.

Other materials which are traditionally present in paints or coating compositions may optionally also be present in the present composition. Such materials are well known to those skilled in the art and include for example plasticizers for the polymer, coalescing agents (such as diethylene glycol, Carbitol TM acetate, butyl Cellosolve TM acetate, butyl Carbitol TM acetate, butyloxy ethanol, alkylene glycols, alkylene glycol monoalkyl ethers, and esters of such alkylene glycols), pH modifiers, pigments, fillers, extending agents, driers, dispersants, and the like.

The relative amounts of the components of the present invention may be varied as will be apparent to one skilled in the art, keeping in mind the desire to provide the unexpectedly improved anti-corrosion properties of the combination of components (a) and (b). Preferably the neutral or overbased salt of the organic acid is present in an amount of about 0.5 to about 50 weight percent, preferably about 1 to about 30 weight percent; the metal salt-containing corrosion inhibitor (other than (a)) is present in an amount of about 1 to about 50 weight percent, preferably about 2 to about 30 weight percent; the film-forming organic polymer is present in an amount of about 5 to about 70 weight percent, preferably about 15 to about 60 weight percent; and the vehicle is present in an amount of about 5 to about 70 weight percent, preferably about 8 to about 50 weight percent.

The dispersed coating compositions of this invention are in general prepared by the intimate blending of the various components under high shear conditions as in a Cowles TM disperser. Typically the components other than (a) are first blended under low shear conditions. Once complete blending has been accomplished, the neutral or overbased salt of organic acid (a) is added under high speed, high shear conditions and the blending continued until an intimate dispersion is achieved. This method of blending, which is described in more detail in U.S. Pat. No. 4,629,753, is preferred particularly when the overbased material is in the form of a gel or non-Newtonian colloidal disperse system. Alternatively, component (b) can be blended into a pre-existing anti-corrosion paint formulation. If the neutral or overbased organic salt and the other metal compound are present as substantially dry solids, the dry solids can be comingled by known mixing techniques and thereafter dispersed in a vehicle if desired.

As an alternative embodiment, the materials of the present invention can be used in a substantially dry form suitable for powder coating. In this application the coating material is normally applied as a dry powder which, when baked at sufficiently high temperatures flows to form a continuous film over the surface to be coated. The coating may be either thermoplastic or thermosetting and may contain such materials as resin-binder (a film-forming polymer in powder or particle form), pigments (colorants and extenders), flow aids, and so on.

The present invention also includes a process for inhibiting corrosion of a metal, comprising applying to a surface of the metal a coating of any of the previously described embodiments of the present invention, and metal articles coated thereby. The composition can be applied by any of a number of known methods such as brushing, spraying, dip coating, flow coating, roller coating, powder coating, and the like. The viscosity of the composition may be adjusted for the particular method of application by adjusting the amount of water or other vehicle present in the composition if a reduced viscosity is required or by addition of fillers such as talc, siliates, calcium carbonate and the like if an increase viscosity is required.

Rheology control agents such as cellulosics can also be added to control flow and leveling properties. In most instances the overbased material, when used in the form of a gel, will itself function as a rheology control agent as well as a dispersing agent. As a result the need for addition of a separate rheology control agent may be reduced. Thus addition of the pigments of the present invention can minimize or prevent settling of the components of a paint composition such that no settling of components is observed after one week of standing.

The dry film thickness produced on the metal substrate is not critical although coatings or films from about 0.5 mils to about 6.0 mils and preferably from about 1.0 mils to about 4.0 mils are generally sufficient to provide adequate rust and corrosion protection. Thicker films can be used if desired, particularly if the metal article is to be subjected to severe corrosion enhancing conditions, or to be stored for prolonged periods of time. After application of the coating it is generally permitted to dry to remove any vehicle which is used. Air drying is commonly used, and this will generally take place at temperatures ranging from ambient temperature to about 150° C. or higher. For some systems such as thermosetting resin systems additional heat may be required to cure the resin. For instance, heating to 177° C. (350° F.) for 20 minutes may be appropriate for treating short oil alkyd/melamine systems. The precise temperatures and times required for complete drying will vary depending on the thickness of the coating and the Tg of any film-forming resins employed, and can be readily determined by those skilled in the art.

As used herein, the term "hydrocarbyl substituent" or "hydrocarbyl group" means a group having a carbon atom directly attached to the remainder of the molecule and having predominantly hydrocarbon character. Such groups include hydrocarbon groups, substituted hydrocarbon groups, and hetero groups, that is, groups which, while primarily hydrocarbon in character, contain atoms other than carbon present in a chain or ring otherwise composed of carbon atoms.

EXAMPLES

Example 1. Preparation of Overbased Calcium Salt Composition

A.

To a 5 L spherical stirred resin pot is added 449 g methanol and 110 g technical grade lime. The mixture is stirred with heating to 43° C. Over a period of 15 minutes 835 g of a mono-substituted alkylbenzenesulfonic acid (having about 80% branched $C_{24}$ groups and about 20% normal $C_{18}$ groups) is added, during which time the temperature rises to 59° C. Stirring is continued for 1 hour at a temperature of 43°–49° C. Thereafter 1211 g of SS-10 mineral spirits is added over a period of 1 hour. After standing overnight, the mixture is again heated to 43°–49° C. Silo lime, 765 g, is added in three portions over a period of 245 minutes during which time carbon dioxide gas is fed into the mixture through a sub-surface inlet at a rate of 57 L/hr (2.0 standard cubic feet per hour). After addition of the carbon dioxide is complete, the system is purged with nitrogen and the alcohol and water are removed by a side-arm trap. The remaining mixture is heated to 150°–160° C. for 1 hour and then cooled to room temperature. The product is isolated by centrifugation for 1 hour at 1600–1700 r.p.m. to yield 2832 g of a material containing 14.5% calcium by weight and having a TBN of 376.5. (TBN is total base number which is (56,100X(mg of KOH) X equivalents of titratable metal)/grams of sample.)

B. Gelling of the material from A.

The material from A, above, 2,689 g, is combined with 674 g SS-10 mineral spirits in a 5 L resin pot and heated with stirring to 43°–49° C. Additional carbon dioxide is fed to the mixture at a rate of 56 L/hr (2.0 standard cubic feet per hour) over 20 minutes. Thereafter the mixture is heated to 60° C. and a premixed solution of methanol (318 g) and water (243 g) is added. The mixture is further heated and maintained at reflux (about 74° C.) for 2 hours. The alcohol and water are removed as above and the temperature of the mixture is increased to 150°–160° C. and maintained for 1 hour. After cooling the product is the gelled overbased acid.

C.

In a 2000 mL resin pot are placed 1369.3 g of the gelled overbased calcium sulfonate from B above in SS-10 mineral spirits. The mixture is heated to 49° C. (120° F.). Carbon dioxide gas is bubbled through the mixture at a rate of 113 L/hr (4.0 s.c.f.h.) with stirring, over a period of 1½ hours. The result is a material with an acid number of 2.0 (by titration to a phenolphthalein endpoint of about pH 8–9) which comprises the calcium salt of alkylated benzenesulfonic acid and 5.5 to 6 moles calcium carbonate per mole of acid.

A portion of the above mixture is spread on a glass plate and dried at 38° C. for seven days. The resulting solid, 60.0 g, is combined with 40.0 of propylene glycol-n-propyl ether, the mixture heated to 110° C. (230° F.), and mixed until uniform, followed by cooling to room temperature.

Example 2. Preparation of Overbased Calcium Salt Composition

The general procedure of Example 1 is followed. A sample is prepared of 2424.3 g of material as from Example 1.B. and heated to 54° C. (130° F.) with stirring. To this mixture is added 153 g methanol and 117.6 g distilled water. To this mixture is added with stirring 519.4 g of pre-melted Oxpet TM 51 oxidized petrolatum from Valvoline having an acid number of 62.1, over a period of about 25 minutes. Thereafter mixing at reflux (about 66° C., 150° F.) is continued for 1 hour or until evolution of $CO_2$ ceases. The mixture is blanketed with nitrogen and the temperature is slowly increased to remove methanol and water in a trap. The result is a material with an acid number of 4.2 which comprises the calcium salt of sulfonic and carboxylic acids and about 5.0 moles calcium carbonate per mole of acid.

A portion of the product is dried for 10 days on a glass plate. A portion of the dried material (60.0 g) is dispersed in propylene glycol n-propyl ether (40.0 g) as in Example 1.

Examples 3-21

Other neutral and overbased salts are prepared as outlined in the above Examples and as indicated in Table I:

TABLE I

| Ex. | Organic acid | Metal | Counterion | Metal ratio |
|---|---|---|---|---|
| 3 | mahogany sulfonic acid | Ca | — | 1 |
| 4 | petrolatum sulfonic acid | Ca | carbonate | 1.2 |
| 5 | naphthalene sulfonic acid | Ca | oxide | 4 |
| 6 | cetylphenol sulfonic acid | Mg | carbonate | 10 |
| 7 | dilauryl beta-naphthol sulfonic acid | Zn | carbonate | 20 |
| 8 | saturated paraffin wax sulfonic acid | Ba | carbonate | 8 |
| 9 | tetraisobutylene sulfonic acid | Sr | carbonate | 8 |
| 10 | petroleum naththalene sulfonic acid | Pb | carbonate | 8 |
| 11 | dodecylbenzene sulfonic acid | Ca | hydroxide | 2 |
| 12 | naphtheneic acids | Ca | borate | 15 |
| 13 | 2-ethylhexanoic acid | Ca | phosphate | 8 |
| 14 | linoleic acid | Ca | phosphite | 5 |
| 15 | propylene tetramer-substituted maleic acid | Ca | sulfate | 6 |
| 16 | tall oil acids | Ca | sulfite | 6 |
| 17 | rosin acid | Ca | thiosulfate | 6 |
| 18 | mixed alkyl phosphoric acids | Ca | carbonate | 10 |
| 18 | phenol | Ca | nitrate | 6 |
| 19 | catechol | Ca | nitrite | 6 |
| 20 | hydroquinone | Ca | carbonate | 31 |
| 21 | octyl phenol | Ca | carbonate | 71 |

Example 22 and Comparative Examples C1–C3

Coating compositions are prepared with the components as indicated in Table II. The first 9 listed components are combined by dispersing pigments using a ball mill, sandmill, three-roll mill, or other suitable device until a degree of dispersion of about 6–7 on the Hegman scale is attained. The mixture so prepared is added to a mixture of the remaining components and mixed.

TABLE II

| Example: | C1 | C2 | 22 | C3 |
|---|---|---|---|---|
| Components (parts weight) | | | | |
| Kelsol TM 3906 resin binder (water reducible alkyd resin) | 117 | 117 | 117 | 167 |
| Aqueous ammonia (28%) | 8.5 | 8.5 | 8.5 | 8.5 |
| Propylene glycol propyl ether | 30 | 30 | 30 | 30 |
| Deionized water | 378 | 378 | 378 | 378 |
| Red iron oxide pigment | 90 | 90 | 90 | 90 |
| Talc, #399 | 75 | 117 | 75 | 81 |
| Fumed silica | 5.4 | 5.4 | 5.4 | 5.4 |
| Strontium chromate | — | 25 | — | — |
| Zinc phosphate | 69 | — | 69 | 127 |
| Kelsol TM 3906 resin binder | 132 | 132 | 132 | 82 |
| Aqueous ammonia (28%) | 6.8 | 6.8 | 6.8 | 4.2 |
| Deionized water | 35 | 171 | 116 | 102 |
| Cobalt carboxylate (dryer) | 5.6 | 5.6 | 5.6 | 5.6 |
| 1,10-Phenanthroline | 0.9 | 0.9 | 0.9 | 0.9 |
| Propylene glycol propyl ether | 9.2 | 32 | 12 | 26 |
| Product of Example 1 | — | — | 47 | — |
| Total | | | 1093 | |

Example C1 is typical of a prior art composition using an "environmentally friendly" pigment (zinc phosphate). Example C2 is typical of a prior art composition using a pigment not recognized as environmentally friendly. Example 22 is a composition of the present invention. Example C3 is similar to Example C1 except that the amount of zinc phosphate is increased.

The four compositions are coated onto steel plates and tested for corrosion resistance as set forth in ASTM B117-85. After exposure of the plates for 500 hours under salt fog conditions or for 192 hours under QCT humidity conditions (ASTM D-4585-86A) at 38° C. (100° F.), the plates are examined. The film of Example 22 exhibits good mechanical properties and imparts good corrosion protection to the plate.

Example 23 and Comparative Examples C4–C6

The tests performed on Example 22 are repeated using plates treated with the compositions shown in Table III.

TABLE III

| Example: | C4 | C5 | 23 | C6 |
|---|---|---|---|---|
| Components (parts weight) | | | | |
| Deionized water | 93 | 93 | 93 | 93 |
| Antifoam agent (Byk TM 035) | 0.3 | 0.3 | 0.3 | 0.3 |
| Ammonium carboxylated electrolyte dispersant (Tamol TM SG-1) | 6.9 | 6.9 | 6.9 | 6.9 |
| Alkylaryl polyether surfactant (Triton TM CR-10) | 1.9 | 1.9 | 1.9 | 1.9 |
| Red iron oxide pigment | 117 | 117 | 117 | 117 |
| Talc | 47 | 58 | 47 | 30 |
| Aluminum silicate (clay) | 23 | 23 | 23 | 23 |
| Strontium chromate | — | 48 | — | — |
| Calcium, strontium phosphosilicate | 47 | — | 47 | 111 |
| Neocryl TM A-640 resin binder (acrylic latex) | 572 | 572 | 572 | 572 |
| Aqueous ammonia (28%) | 7.5 | 7.5 | 7.5 | 7.5 |
| Deionized water | — | — | 9.5 | 105 |
| Diethylene glycol monobutyl ether | 18 | 18 | 18 | 18 |
| Ethylene glycol monobutyl ether | 11 | 11 | 11 | 11 |
| Propylene glycol propyl ether | 50 | 50 | 42 | 50 |
| Product of Example 2 | — | — | 19 | — |
| Colloid 643 TM defoamer | 1 | 1 | 1 | 1 |
| Santicizer TM 160 butyl | 5.7 | 5.7 | 5.7 | 5.7 |

TABLE III-continued

| Example: | C4 | C5 | 23 | C6 |
|---|---|---|---|---|
| benzyl phthalate | | | | |
| Ammonium dichromate, 10% in water | 4.9 | 4.9 | 4.9 | 4.9 |
| Total | | | 1027 | |

The plate treated with the composition 23 exhibits good corrosion protection.

Examples 24–36

Example 22 is repeated, replacing the zinc phosphate with the metallic compounds listed in Table IV. Plates coated with the compositions exhibit good corrosion resistance, with both "environmentally friendly" and conventional anticorrosion agents.

TABLE IV

| Example | Metallic compound |
|---|---|
| 24 | barium metaborate |
| 25 | calcium silicate |
| 26 | calcium borosilicate |
| 27 | calcium phosphosilicate |
| 28 | calcium molybdate |
| 29 | zinc oxide |
| 30 | zinc molybdate |
| 31 | zinc phosphate |
| 32 | zinc hydroxyphosphite |
| 33 | strontium chromate |
| 34 | magnesium borate |
| 35 | barium phosphite |
| 36 | lead oxide |

Example 37–40

Example 23 is repeated except the relative amounts of the calcium, strontium phosphosilicate and the product of Example 2 are varied as shown:

| Example | Prod. of Ex. 2 | Ca, Sr phosphosilicate | dry wt. ratio |
|---|---|---|---|
| 37 | 8.3 | 95 | 1:20 |
| 38 | 8.3 | 55 | 1:10 |
| 39 | 50 | 30 | 1:1 |
| 40 | 95 | 2.9 | 20:1 |

Example 41

Eighty-three parts by weight of the product of Example 1 are blended with fifty parts by weight of calcium, strontium phosphosilicate. The mixture is applied to the surface of an iron article and the solvent is allowed to evaporate.

Example 42

A powder coating composition is prepared by combining:
600 g of diglycidyl ether of bisphenol A, having an epoxy equivalent weight of 640–730 and an epoxy content of 1.37 to 1.56, obtained from Dow Chemical Corp. under the name "DER 692 U";
33 g of a substituted dicyandiamide having an amine value of 260 to 320, obtained from Ciba-Geigy Corp. under the name Araldite TM HT 2844;
5.0 g benzoin (2-hydroxy-2-phenylacetophenone)
152 g barium sulfate pigment
104 g titanium dioxide pigment
1.3 g carbon black pigment
47 g zinc phosphate
53 g of the dried solid from Example 1 (before addition of the propylene glycol-n-propyl ether).

Each of the documents referred to above is incorporated herein by reference. As used herein, the expression "consisting essentially of" permits the inclusion of substances which do not materially affect the basic and novel characteristics of the composition under consideration.

What is claimed is:

1. A corrosion inhibitor composition comprising:
   (a) at least one neutral or overbased salt of an organic acid selected from the group consisting of phosphorus acids, thiophosphorus acids, sulfur acids, thiocarboxylic acids, and phenols, and
   (b) at least one metal-containing corrosion inhibitor compound other than a neutral or overbased salt of an organic acid;
   wherein the amount of the salt of (a) is sufficient to provide improved corrosion inhibition properties compared with those obtained by use of component (b) alone.

2. The composition of claim 1 wherein the neutral or overbased salt is a calcium, magnesium, zinc, barium, strontium, or lead salt.

3. The composition of claim 2 wherein the neutral or overbased salt is a calcium salt.

4. The composition of claim 1 wherein the corrosion inhibitor of (b) is a metal salt.

5. The corrosion inhibitor composition of claim 1 wherein the metal containing corrosion inhibitor of (b) is selected from at least one of the group consisting of compounds of zinc, calcium, magnesium, barium, lead, and strontium.

6. The corrosion inhibitor composition of claim 1 wherein the corrosion inhibitor of (b) is selected from at least one of the group consisting of metal chromates, phosphates, phosphosilicates, oxides, borates, metaborates, borosilicates, phosphites, hydroxyphosphites, silicates, and molybdates.

7. The corrosion inhibitor of claim 1 wherein the metal-containing corrosion inhibitor of (b) is selected from at least one of the group consisting of barium metaborate, calcium silicate, calcium borosilicate, calcium phosphosilicate, calcium molybdate, calcium strontium phosphosilicate, zinc molybdate, zinc phosphate, and zinc hydroxyphosphite.

8. The corrosion inhibitor of claim 1 wherein the metal-containing corrosion inhibitor of (b) is zinc phosphate.

9. The corrosion inhibitor of claim 1 wherein the metal-containing corrosion inhibitor of (b) is mixed strontium and calcium phosphosilicates.

10. The corrosion inhibitor of claim 1 wherein the metal-containing corrosion inhibitor of (b) is barium metaborate.

11. The corrosion inhibitor composition of claim 1 wherein the neutral or overbased salt of an organic acid comprises 0 to about 60 equivalents of metal carbonate, oxide, hydroxide, borate, phosphate, phosphite, sulfate, sulfite, thiosulfate, nitrate, or nitrite per mole of salt of the organic acid.

12. The corrosion inhibitor of claim 11 wherein the neutral or overbased salt comprises 0 to about 60 equivalents of calcium carbonate per mole of salt of the organic acid.

13. The corrosion inhibitor of claim 12 wherein the amount of calcium carbonate is 0.2 to about 20 equivalents per mole of salt of the organic acid.

14. The corrosion inhibitor composition of claim 1 wherein the organic acid is at least one sulfonic acid.

15. The corrosion inhibitor composition of claim 1 wherein the organic acid comprises a hydrocarbon chain of about 10 to about 70 carbon atoms.

16. The corrosion inhibitor composition of claim 1 wherein the neutral or overbased salt of an organic acid is prepared as a mixture in a liquid carrier 17. The corrosion inhibitor composition of claim 16 wherein the neutral or overbased salt is prepared as a mixture in propylene glycol monopropyl ether.

18. The corrosion inhibitor composition of claim 1 wherein the neutral or overbased salt is prepared as a mixture on a solid carrier.

19. The corrosion inhibitor composition of claim 18 wherein the solid carrier is titanium dioxide, magnesium silicate, or zinc phosphate.

20. The corrosion inhibitor of claim 1 wherein the neutral or overbased salt and the metal-containing corrosion inhibitor other than a neutral or overbased salt of an organic acid are admixed with solid particles of a film-forming polymer.

21. The corrosion inhibitor composition of claim 1 wherein the neutral or overbased salt is an overbased salt which is prepared as a non-Newtonian colloidal disperse system.

22. The corrosion inhibitor composition of claim 1 wherein the weight ratio of component (a) to component (b) is about 1:20 to about 20:1.

23. The corrosion inhibitor composition of claim 1 wherein the weight ratio of component (a) to component (b) is about 1:1 to about 1:10.

24. The corrosion inhibitor composition of claim 1, 7, 12, 16, or 18, further comprising a vehicle suitable for dissolving or dispersing components (a) and (b), present in a sufficient amount to provide a concentrate composition.

25. The corrosion inhibitor composition of claim 1, further comprising a vehicle suitable for dissolving or dispersing components (a) and (b) and for applying components (a) and (b) to a surface to impart corrosion resistance thereto.

26. The corrosion inhibitor composition of claim 7, 12, 16, or 18, further comprising a vehicle suitable for dissolving or dispersing components (a) and (b) and for applying components (a) and (b) to a surface to impart corrosion resistance thereto.

27. The corrosion inhibitor composition of claim 25 wherein the vehicle comprises an organic solvent.

28. The corrosion inhibitor composition of claim 25 wherein the vehicle comprises water.

29. The corrosion inhibitor composition of claim 25 further comprising a film-forming amount of a film-forming organic polymer.

30. The corrosion inhibitor composition of claim 29 wherein the neutral or overbased salt of an organic acid is present in an mount of about 0.5 to about 50 weight percent, the metal-containing corrosion inhibitor other than a neutral or overbased salt of an organic acid is present in an amount of about 1 to about 50 weight percent, the film-forming organic polymer is present in an amount of about 5 to about 70 weight percent, and the vehicle is present in an amount of about 5 to about 70 weight percent.

31. The corrosion inhibitor composition of claim 30 wherein the neutral or overbased salt of an organic acid is present in an amount of about 1 to about 30 weight percent, the metal-containing corrosion inhibitor other than a neutral or overbased salt of an organic acid is present in an amount of about 2 to about 30 weight percent, the film-forming organic polymer is present in an amount of about 15 to about 60 weight percent, and the vehicle is present in an amount of about 8 to about 50 weight percent.

32. A process for inhibiting corrosion of a metal, comprising applying to a surface of the metal a coating comprising:
(a) at least one neutral or overbased salt of an organic acid selected from the group consisting of phosphorus acids, thiophosphorus acids, sulfur acids, thiocarboxylic acids, and phenols, and
(b) at least one metal-containing corrosion inhibitor compound other than a neutral or overbased salt of an organic acid;
wherein the amount of the salt of (a) is sufficient to provide improved corrosion inhibition properties compared with those obtained by use of component (b) alone.

33. The process of claim 32 wherein the metal-containing corrosion inhibitor of (b) is selected from at least one of the group consisting of salts of zinc, calcium, magnesium, barium, lead, and strontium.

34. The process of claim 33 wherein the metal-containing corrosion inhibitor of (b) is selected from at least one of the group consisting of barium metaborate, calcium silicate, calcium borosilicate, calcium phosphosilicate, calcium molybdate, calcium strontium phosphosilicate, zinc oxide, zinc molybdate, zinc phosphate, and zinc hydroxyphosphite.

35. The process of claim 32 wherein the neutral or overbased calcium salt of an organic acid comprises 0 to about 60 equivalents of calcium carbonate per mole of salt of the organic acid.

36. The process of claim 36 wherein the corrosion inhibitor composition further comprising a vehicle suitable for dissolving or dispersing components (a) and (b) and for applying components (a) and (b) to a surface to impart corrosion resistance thereto.

37. The process of claim 36 wherein the vehicle further comprises a film-forming amount of a film-forming organic polymer.

38. The process of claim 32 wherein the neutral or overbased salt and the metal-containing corrosion inhibitor other than a neutral or overbased salt of an organic acid are admixed with solid particles of a film-forming polymer.

39. The process of claim 32 wherein the neutral or overbased salt of an organic acid is supplied as a mixture on a solid carrier.

40. The product of any one of claims 32–39.

* * * * *